United States Patent
Marius

(10) Patent No.: US 8,464,209 B2
(45) Date of Patent: Jun. 11, 2013

(54) USING COLLABORATIVE DEVELOPMENT INFORMATION IN A TEAM ENVIRONMENT

(75) Inventor: Gabriel Marius, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1163 days.

(21) Appl. No.: 11/725,258

(22) Filed: Mar. 19, 2007

(65) Prior Publication Data

US 2008/0235654 A1 Sep. 25, 2008

(51) Int. Cl.
*G06F 9/44* (2006.01)

(52) U.S. Cl.
USPC .......................... 717/105; 717/106; 717/110

(58) Field of Classification Search
USPC ............... 717/100–103, 110–113, 120–123, 717/106
See application file for complete search history.

(56) References Cited

U.S. PATENT DOCUMENTS

| | | | |
|---|---|---|---|
| 5,848,274 A | 12/1998 | Hamby et al. | |
| 5,911,073 A | 6/1999 | Mattson, Jr. et al. | |
| 6,233,600 B1 | 5/2001 | Salas et al. | |
| 6,732,364 B1 | 5/2004 | Bhaskaran et al. | |
| 7,000,220 B1 * | 2/2006 | Booth | 717/110 |
| 7,003,369 B1 | 2/2006 | Gage | |
| 7,028,225 B2 * | 4/2006 | Maso et al. | 714/47.2 |
| 7,043,529 B1 | 5/2006 | Simonoff | |
| 7,069,547 B2 * | 6/2006 | Glaser | 717/154 |
| 7,149,734 B2 * | 12/2006 | Carlson et al. | 1/1 |
| 7,181,734 B2 * | 2/2007 | Swamy et al. | 717/144 |
| 7,194,475 B2 * | 3/2007 | DelMonaco et al. | 1/1 |
| 7,509,416 B1 * | 3/2009 | Edwardson et al. | 709/224 |
| 7,533,369 B2 * | 5/2009 | Sundararajan et al. | 717/123 |
| 7,716,649 B2 * | 5/2010 | Clemm et al. | 717/128 |
| 7,788,711 B1 * | 8/2010 | Sun et al. | 726/8 |
| 7,837,753 B2 * | 11/2010 | Roundy et al. | 55/385.3 |
| 2002/0198873 A1 * | 12/2002 | Chu-Carroll | 707/3 |
| 2003/0009740 A1 | 1/2003 | Lan | |

(Continued)

FOREIGN PATENT DOCUMENTS

CA 2533942 A1 8/2006
JP 01-292529 11/1989

(Continued)

OTHER PUBLICATIONS

Ballarini et al., "Modeling Real Requirements for Cooperative Software Development: A Case Study", http://www.dis.uniroma1.it/~mecella/publications/Miscellanea/CSSE2003.pdf.

(Continued)

*Primary Examiner* — Phillip H Nguyen

(57) ABSTRACT

Various technologies and techniques are disclosed that provide and interact with a collaborative development information store in a team software development environment. A submission service updates an active meta-model of an application in a central information store that is used by multiple users. A notification service operating in a particular software development environment receives notice that changes have been made to the active meta-model. Information received from the notification service is then used to update a display in the particular software development environment. On the database server, a reception service is provided that receives active meta-model information of the application being developed by the multiple users as the information changes. A storage service is provided to store the received active meta-model information in a specific relational database structure that is operable to allow artifacts to be added without alteration to the specific relational database structure.

18 Claims, 9 Drawing Sheets

U.S. PATENT DOCUMENTS

| | | | |
|---|---|---|---|
| 2003/0014513 A1 | 1/2003 | Ruths et al. | |
| 2003/0135565 A1 | 7/2003 | Estrada | |
| 2003/0135840 A1* | 7/2003 | Szabo et al. | 717/102 |
| 2004/0085354 A1 | 5/2004 | Massand | |
| 2004/0117454 A1 | 6/2004 | Koont et al. | |
| 2004/0133875 A1* | 7/2004 | Kramer | 717/101 |
| 2004/0205129 A1 | 10/2004 | Bongiorni et al. | |
| 2005/0097508 A1 | 5/2005 | Jacovi et al. | |
| 2005/0227218 A1 | 10/2005 | Mehta et al. | |
| 2006/0026251 A1* | 2/2006 | Cheng et al. | 709/207 |
| 2006/0041440 A1* | 2/2006 | Cheng et al. | 705/1 |
| 2006/0080432 A1 | 4/2006 | Spataro et al. | |
| 2006/0150150 A1* | 7/2006 | Tiwari et al. | 717/110 |
| 2006/0212843 A1* | 9/2006 | Zaky et al. | 717/106 |
| 2006/0218623 A1* | 9/2006 | Hodges et al. | 726/3 |
| 2007/0106767 A1* | 5/2007 | Yamamoto et al. | 709/223 |
| 2007/0143735 A1 | 6/2007 | Clemm et al. | |
| 2007/0143752 A1* | 6/2007 | Clemm et al. | 717/178 |
| 2007/0236746 A1* | 10/2007 | Benedek et al. | 358/3.26 |
| 2008/0229282 A1* | 9/2008 | deVries et al. | 717/122 |
| 2008/0320436 A1* | 12/2008 | Hughes | 717/100 |
| 2009/0210862 A1* | 8/2009 | Viswanadha et al. | 717/125 |

FOREIGN PATENT DOCUMENTS

| | | |
|---|---|---|
| JP | 09-006605 | 1/1997 |
| JP | 09-016392 | 1/1997 |
| JP | 10-083420 | 3/1998 |
| JP | 2000-148458 | 5/2000 |
| JP | 2000-235496 A | 8/2000 |
| JP | 2001-092650 A | 4/2001 |
| WO | WO0067118 A2 | 11/2000 |

OTHER PUBLICATIONS

Carmichael, Dr. Andy, "Supporting Collaborative Software Development", http://www.intland.com/asset/AndyCarm.pdf.

Rimpilainen et al., "Sakai: An Environment for Virtual Research", http://www.ennenjanyt.net/2006_2/rimpilainen.pdf.

Takemiya et al., "Development of a Virtual Research Environment across Multi-institutions", http://www.tokyo.rist.or.jp/sss2001/Abst/O_Takemiya_Hiroshi.pdf.

International Search Report and Written Opinion Received for PCT Application No. PCT/US2008/054319, mailed on Jul. 24, 2008, 10 pages.

Office Action received for Japanese Patent Application No. 2010-501032, mailed Jul. 27, 2012, 13 pgs. including 7 pgs. English translation.

Office Action received for Japanese Patent Application No. 2010-501032, mailed Nov. 30, 2012, 13 pages including 7 pages English translation.

* cited by examiner

USING COLLABORATIVE DEVELOPMENT INFORMATION IN A TEAM ENVIRONMENT

BACKGROUND

Software applications must be transformed from source code into machine instructions in order for the application to execute. This transformation process is called "compiling". During compilation, the source code is first turned into a language-agnostic and machine-agnostic set of instructions, sometimes referred to as "intermediate code". The intermediate code is then turned into machine instructions specific to the particular computer platform on which the particular application will run. Compilation typically occurs on a single computer, and when completed, the intermediate code generated by the compilation process is discarded. Thus, any useful information that could be obtained from this intermediate code later in the development process is lost.

In many cases, software applications are developed in team-based environments. These teams are comprised of team members playing several roles that support the overall project goals. Each team member typically runs the software development application on their own local computer. When a particular team member compiles the program, runs a code analyzer to analyze performance, performs debugging, or other various development-related tasks, the resulting details from these processes are typically stored on that team member's local computer. While that team member may submit the source code to a source code control server that the entire team can access, the various system generated artifacts resulting from the development process that led up to the version being checked in to the server are typically either lost or are not easily distributable. This means that other team members do not get whatever benefit may be gained by accessing those results. For example, as a developer team member is working on a given application, the developer may use a code profiler to analyze the performance of the application. In doing so, the developer gains specific knowledge about the applications performance. The artifacts and knowledge gained by creating the artifacts from profiling the applications are local to the developer and are not easily shared.

Furthermore, in the course of executing their assigned roles, team members often create other artifacts related to the project in addition to the source code itself, such as models, diagrams, work items, etc. Just like with the system generated artifacts, in many cases, these user-created artifacts are also stored on a particular team member's computer only, are lost, or are not easily distributable to the other team members. Thus, large amounts of valuable development data and artifacts related to a particular software development project being developed in a team environment are either dispersed across various team member computers and thus inaccessible by the entire team, or they are lost forever.

SUMMARY

Various technologies and techniques are disclosed that provide and interact with a collaborative development information store in a team software development environment. A submission service updates an active meta-model of an application in a central information store that is used by multiple users. A notification service operating in a particular software development environment receives notice that changes have been made to the active meta-model. Information received from the notification service is then used to update a display in the particular software development environment being used by a particular user. As one non-limiting example, the information can be displayed as the particular user is typing code to note something relevant to that particular code that has occurred as a result of an action of another team member.

On the database server, a reception service is provided that receives active meta-model information of the application being developed by the multiple users as the information changes. A storage service is provided to store the received active meta-model information in a specific relational database structure that is operable to allow artifacts to be added without alteration to the specific relational database structure.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
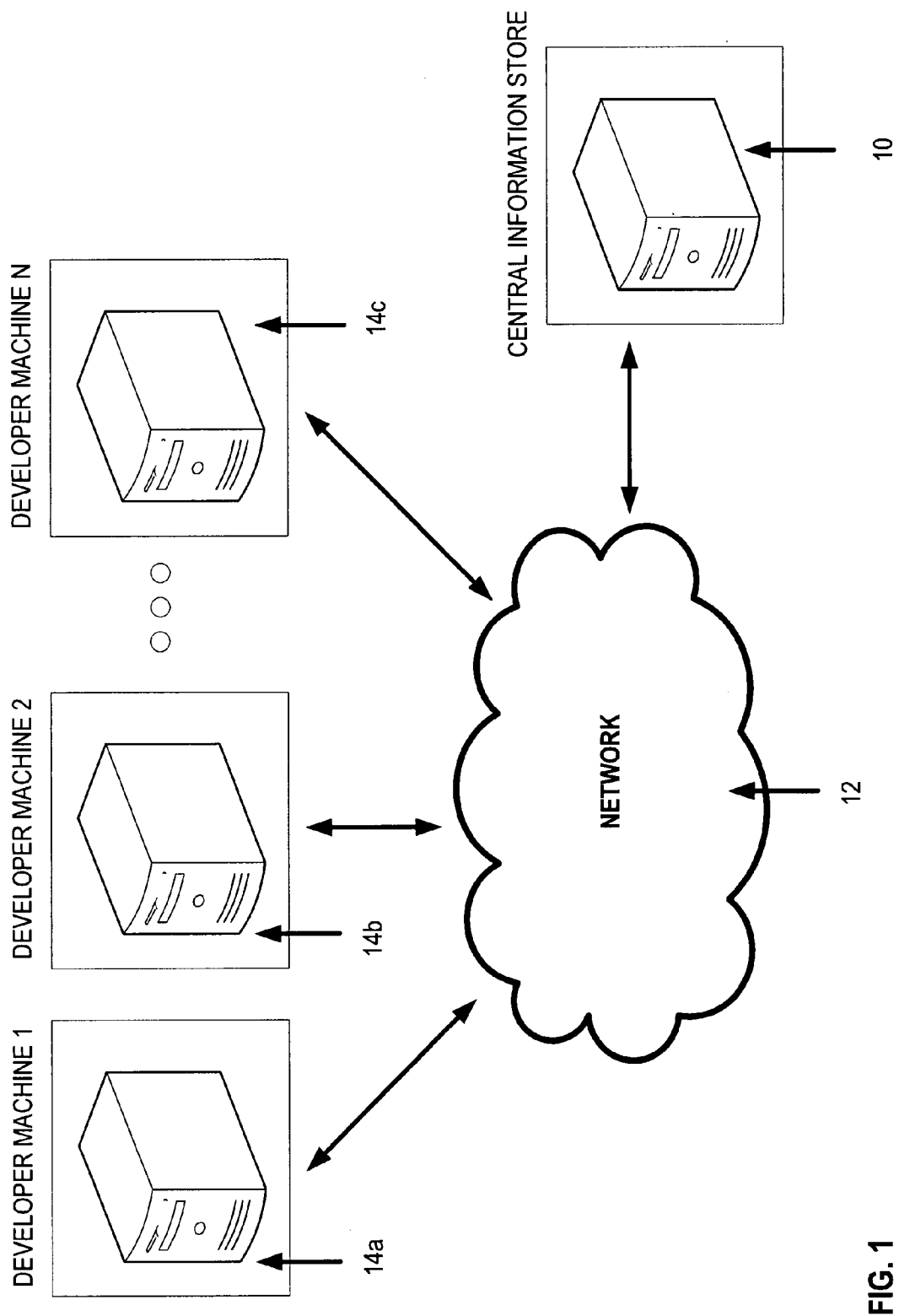
FIG. 1 is a diagrammatic view of a computer system using a collaborative development information store.

For the purposes of promoting an understanding of the principles of the invention, reference will now be made to the embodiments illustrated in the drawings and specific language will be used to describe the same. It will nevertheless be understood that no limitation of the scope is thereby intended. Any alterations and further modifications in the described embodiments, and any further applications of the principles as described herein are contemplated as would normally occur to one skilled in the art.

The system may be described in the general context as a software development application. One or more of the techniques described herein can be implemented as features within a software development program such as MICROSOFT® VISUAL STUDIO®, or from any other type of program or service that participates in the software development process in a team environment.

In one implementation, a system is provided that uses a centralized database or other information store to store real-time, active meta-model information about a particular software application being developed by a team of developers and/or other users. The term "active meta-model" as used herein refers to system-generated artifacts and user-generated artifacts that reflect a current state of the application, the structure of the application, and a history of how the application has evolved. System-generated artifacts include application structure, intermediate code, annotations, and other analysis data that the system generates. User-generated artifacts include work items, project plans, diagrams, annotations explaining certain code, and so on that could potentially be associated with the underlying application structure. The centralized database is then accessed by the software development applications being used by the team of developers to provide the team with access to the active meta-model information. By having access to this information, developers are provided with real-time, relevant information about the active state of the application under development by a team of other people. As one non-limiting example, this information can include notifying developer A that a code profiling process that was run by developer B has just marked a certain portion of code as "slow" that developer A is about to call from his code. In one implementation, this is accomplished by associating the performance characteristics of a given code module, type, method etc. with the meta-representation. Thus, as developer B adds a call to the method in question, the associated performance data can be found which was added by A and action can be taken.

As shown in FIG. 1, an exemplary computer system to use for implementing one or more parts of the system includes one or more development machines, such as central information store 10, network 12, and development machines 14a, 14b, and 14c. Development machines are computers that are used by software developers for the purpose of writing software applications. Central information store 12 includes one or more computers that store data and allow other network resources to access that data. In one implementation, central information store 12 stores active meta-model information of an application being developed by multiple users in a team environment. In one implementation, a local central information store 12 can alternatively or additionally be stored on one or more of development machines 14a, 14b, and 14c, such as to allow participation in a more peer-to-peer level sharing on larger projects and/or for implementations that do not use a central store. Network 12 is used to provide communication between development machines 14a, 14b, 14c, and central information store 10. Network 12 can be implemented as a local area network, wide area network, over the Internet, using a wired or wireless connection, and/or in other such variations as would occur to one of ordinary skill in the computer software art.

Figure 2:
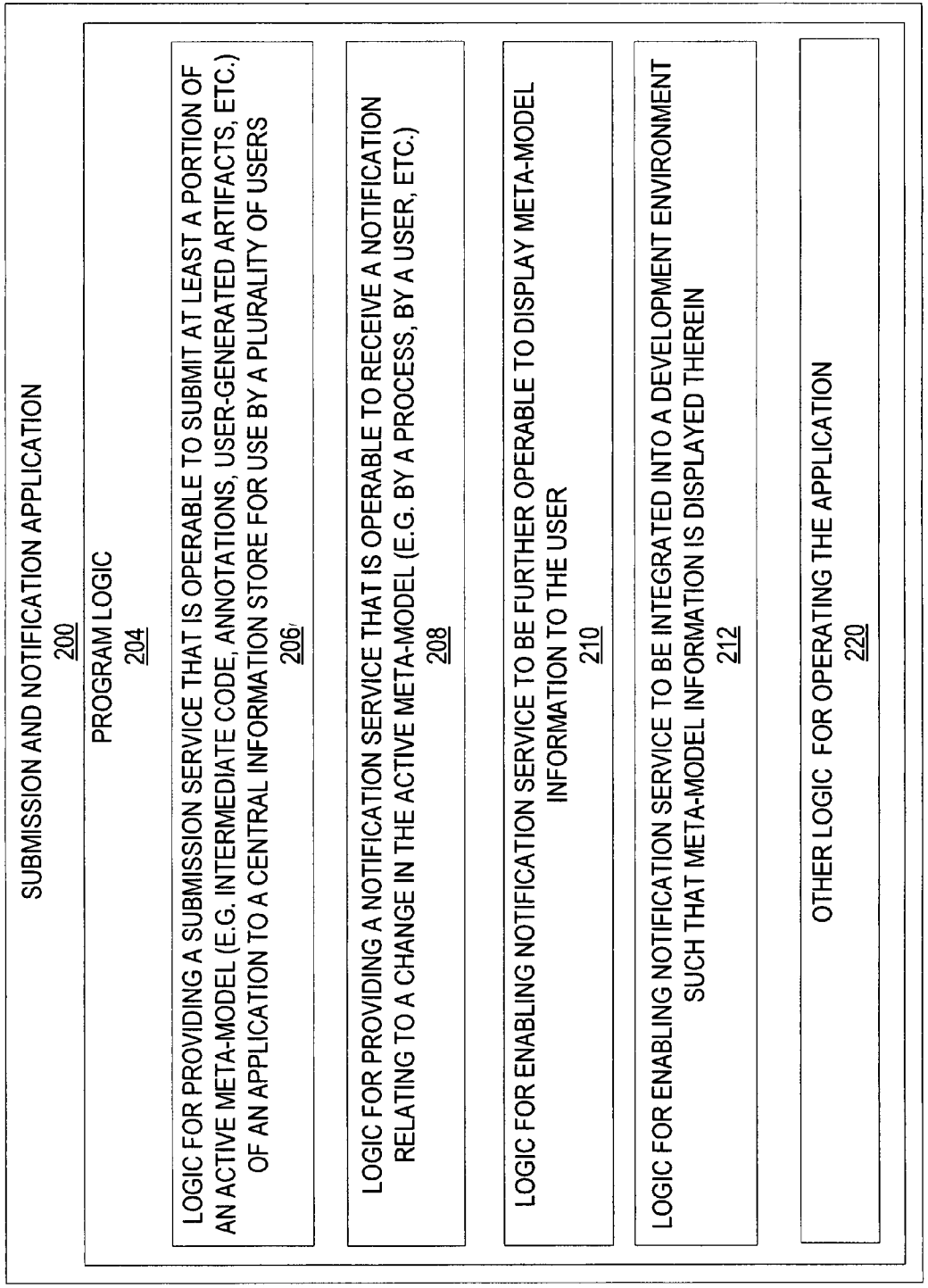
FIG. 2 is a diagrammatic view of submission and notification application of one implementation of the system of FIG. 1.

Turning now to FIG. 2 with continued reference to FIG. 1, a submission and notification application 200 operating on computing device 600 is illustrated. Submission and notification application 200 is one of the application programs that reside on computing device 600 (of FIG. 11). In one implementation, submission and notification application 200 is located on one or more of developer workstations 14A, 14B, or 14C (from FIG. 1). However, it will be understood that submission and notification application 200 can alternatively or additionally be embodied as computer-executable instructions on one or more computers and/or in different variations than shown on FIG. 11. Alternatively or additionally, one or more parts of submission and notification application 200 can be part of system memory 604 (of FIG. 11), on other computers and/or applications 615 (of FIG. 11), or other such variations as would occur to one in the computer software art. Submission and notification application 200 includes program logic 204, which is responsible for carrying out some or all of the techniques described herein. Program logic 204 includes logic for providing a submission service that is operable to submit at least a portion of an active meta-model (e.g. intermediate code, annotations, user-generated artifacts, etc.) of an application to a central information store for use by a plurality of users 206; logic for providing a notification service that is operable to receive a notification relating to a change in the active meta-model (e.g. by a process, by a user, etc.) 208; logic for enabling notification service to be further operable to display meta-model information to the user 210; logic for enabling notification service to be integrated into a development environment such that meta-model information is displayed therein 212; and other logic for operating the application 220. In one implementation, program logic 204 is operable to be called programmatically from another program, such as using a single call to a procedure in program logic 204.

Figure 3:
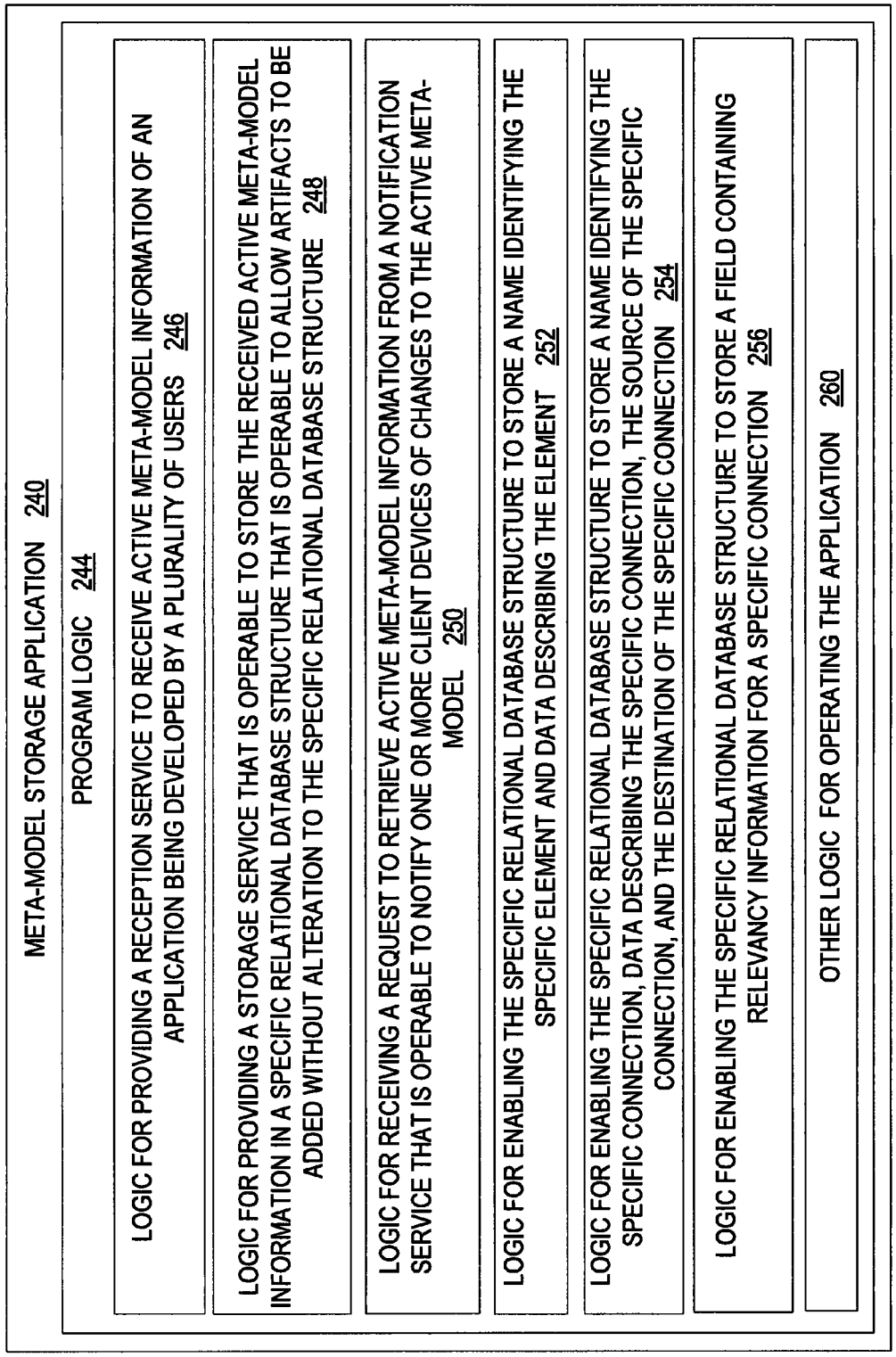
FIG. 3 is a diagrammatic view of meta-model storage application of one implementation operating on the system of FIG. 1.

Turning now to FIG. 3 with continued reference to FIG. 1, a meta-model storage application 240 operating on computing device 600 (of FIG. 11) is illustrated. Meta-model storage application 240 is one of the application programs that reside on computing device 600. However, it will be understood that meta-model storage application 240 can alternatively or additionally be embodied as computer-executable instructions on one or more computers and/or in different variations than shown on FIG. 11. Alternatively or additionally, one or more parts of meta-model storage application 240 can be part of system memory 604 (of FIG. 11), on other computers and/or applications 615 (of FIG. 11), or other such variations as would occur to one in the computer software art.

Meta-model storage application 240 includes program logic 244, which is responsible for carrying out some or all of the techniques described herein. Program logic 244 includes logic for providing a reception service to receive active meta-model information of an application being developed by a plurality of users 246; logic for providing a storage service that is operable to store the received active meta-model information in a specific relational database structure that is operable to allow artifacts to be added without alteration to the specific relational database structure 248; logic for receiving a request to retrieve active meta-model information from a notification service that is operable to notify one or more client devices of changes to the active meta-model 250; logic for enabling the specific relational database structure to store a name identifying the specific element and data describing the element 252; logic for enabling the specific relational database structure to store a name identifying the specific connection, data describing the specific connection, the source of the specific connection, and the destination of the specific connection 254; logic for enabling the specific relational database structure to store a field containing relevancy information for a specific connection 256; and other logic for operating the application 260. In one implementation, program logic 244 is operable to be called programmatically from another program, such as using a single call to a procedure in program logic 244.

Figure 4:
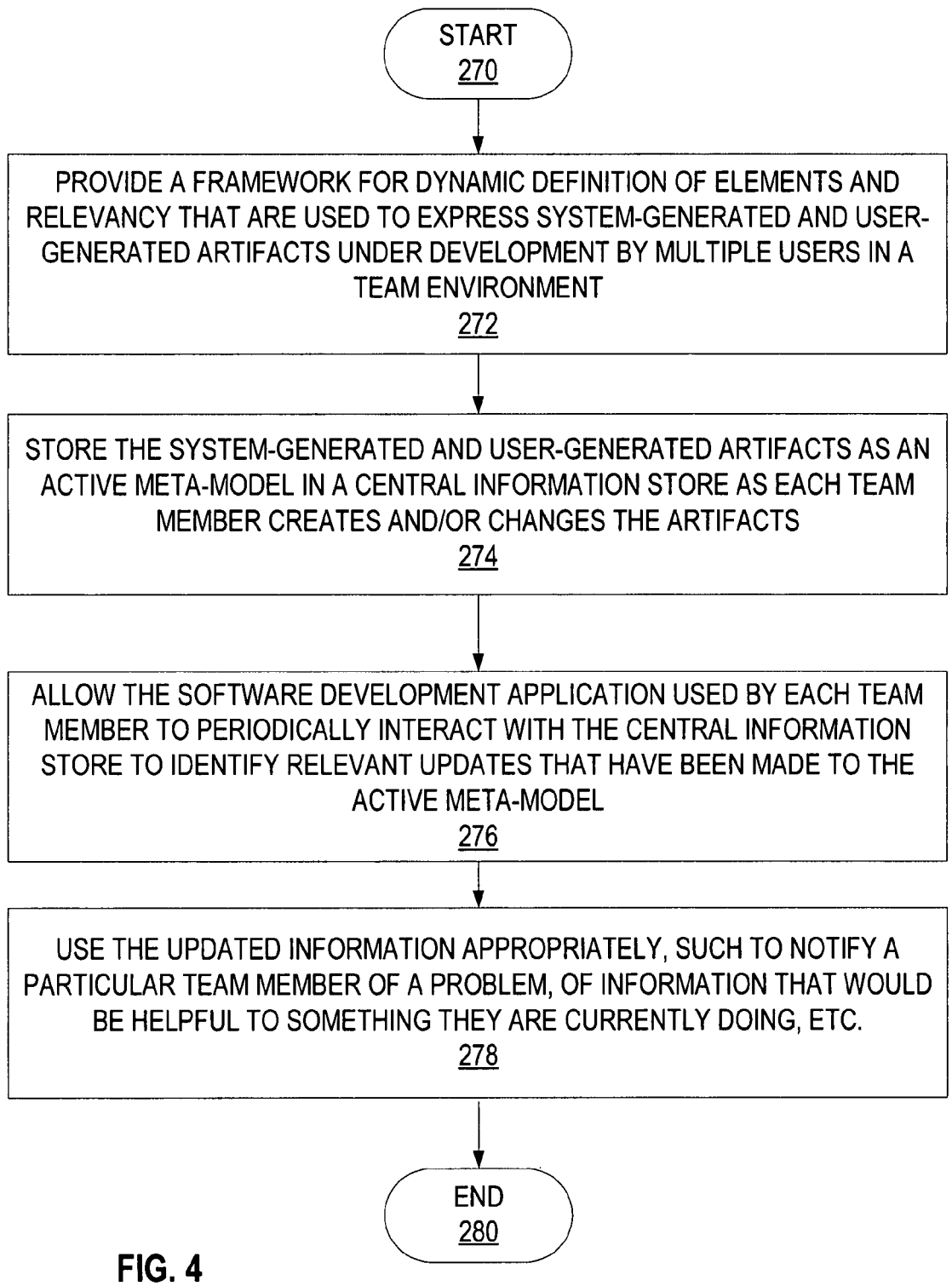
FIG. 4 is a process flow diagram for one implementation illustrating the high level stages of the system of FIG. 1.
Figure 5:
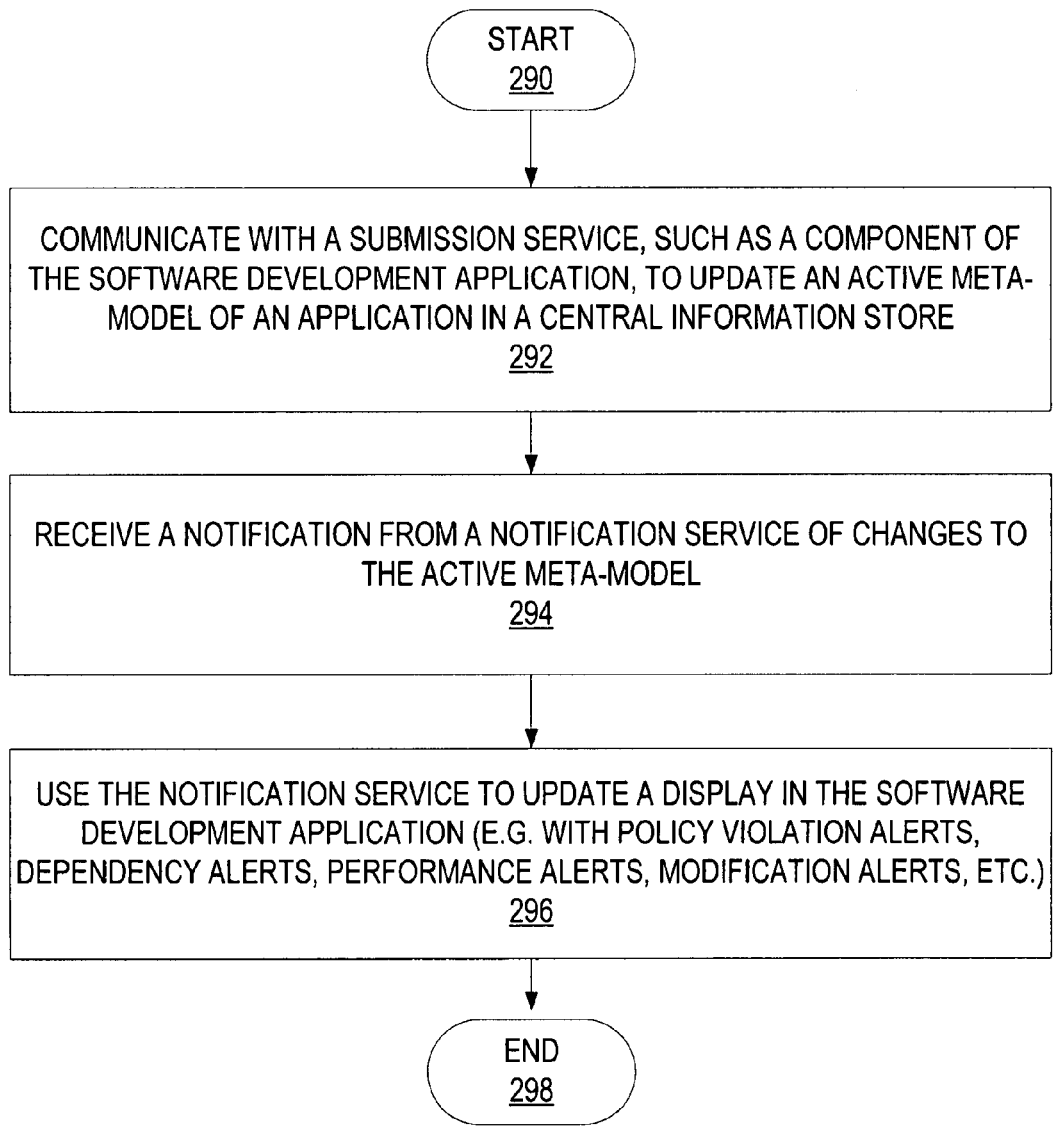
FIG. 5 is a process flow diagram for one implementation illustrating the stages involved in interacting with an active meta-model of an application in a central information store.

Turning now to FIGS. 4-5 with continued reference to FIG. 1, the stages for implementing one or more implementations of the system of FIG. 1 are described in further detail. FIG. 4 is a process flow diagram illustrating the high-level stages for one implementation of the system of FIG. 1. In one form, the process of FIG. 4 is at least partially implemented in the operating logic of computing device 600 (of FIG. 11). While the steps identified in FIG. 4 are described in a certain order, it will be appreciated that these steps can occur in any order, and/or simultaneously with each other, or not at all. The process begins at start point 270 with providing a framework for dynamic definition of elements and relevancy that are used to express system-generated and user-generated artifacts under development by multiple users in a team environment (stage 272). The system-generated and user-generated artifacts are stored as an active meta-model in a central information store as each team member creates and/or changes the artifacts (stage 274). The software development application used by each team member periodically interacts with the central information store to identify relevant updates that have been made to the active meta-model (stage 276). The updated information is used appropriately, such to notify a particular team member of a problem, of information that would be helpful to something they are currently doing, etc. (stage 278). The process ends at end point 280.

FIG. 5 is a process flow diagram for one implementation illustrating the stages involved in interacting with an active meta-model of an application in a central information store. In one form, the process of FIG. 5 is at least partially implemented in the operating logic of computing device 600 (of FIG. 11). While the steps identified in FIG. 5 are described in a certain order, it will be appreciated that these steps can occur in any order, and/or simultaneously with each other, or not at all. The process begins at start point 290 with communicating with a submission service, such as a component of the software development application, to update an active meta-model of an application in a central information store (stage 292). In one implementation, these updates are sent by each respective team member workstation as the team member further develops a particular software application. At any given moment, one or more of the respective team member workstations can receive notifications from a notification service of changes to the active meta-model (stage 294). These changes could have been inspired by work done by the particular team member himself, or by a different team member. The notifications can be configurable beyond just changes, and can be for varying reasons indicate a particular event has happened with the underlying information. For example, the logic that is used to identify the corresponding notifications and people can be limited and/or enhanced based upon policy. As an example of this, a developer working on a section of code a year ago may not receive an update notification of a specification change that just happened, but a developer that worked on the source code two weeks ago would, based on a system-wide setting to indicate who should be notified and when.

The notification service is used to update a display in the software development application used by a respective team member with appropriate information describing the change (stage 296). In one implementation, the software development application intercepts and analyzes the changes to the active-meta model and then determines when and how to notify the user. In another implementation, the software development application receives the notices and just displays them without filtering and/or interpreting them. Some non-limiting examples of the type of information that can be displayed to users include policy violation alerts, dependency alerts, performance alerts, modification alerts, etc. (stage 296). A policy violation alert can indicate that the user has made a change that impacted the active-meta model in a way that violates a policy set for the system. A dependency alert can inform the user that some code they are changing now depends on something that is no longer available, that has been marked as slow, that is currently being edited by another user, and so on. A performance alert can inform the user that that same code was marked as slow performing by another user who worked on it before. These are just a few non-limiting examples of the types of information that the system can issue upon analyzing the active meta-model contained in the central information store. The process ends at end point 298.

Figure 6:
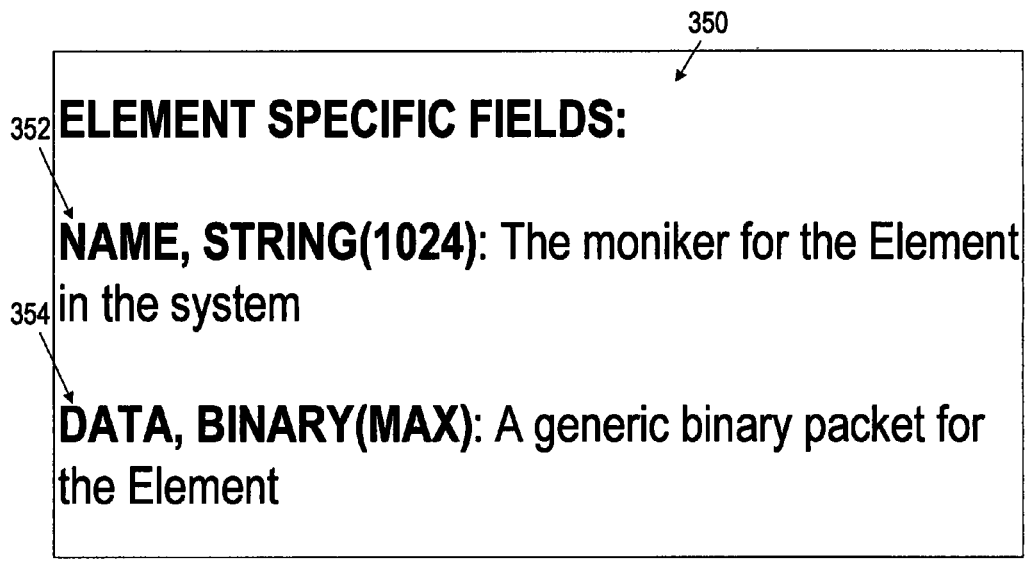
FIG. 6 is a diagram illustrating element-specific fields contained in the central information store in one implementation of the system of FIG. 1.

Turning now to FIGS. 6-10, several diagrams are used to illustrate an exemplary database structure that can be used to implement the active meta-model stored in the central information store and used in the team development environment. FIG. 6 is a diagram illustrating element-specific fields 350 contained in the central information store in one implementation of the system of FIG. 1. In one implementation, an abstract storage definition is necessary since programs and annotations vary widely. However, the overall structure of the schema described herein for one implementation is non-limiting, and various other database schemas could also be used for implementing some or all of the techniques discussed herein. In one implementation, elements are generic items which serve as nouns in the central information store. A few non-limiting examples of elements include methods, types, assemblies, metadata attributes, etc. Individual elements can have any number of properties as needed in their general definition. Each tool, vendor, and/or system can define elements dynamically and provide data as needed. Each element contains a name field 352 as well as the data field 354. The name field 352 is a string that describes the element in the system. The data field 354 is a binary packet that stores details about the element.

Figure 7:
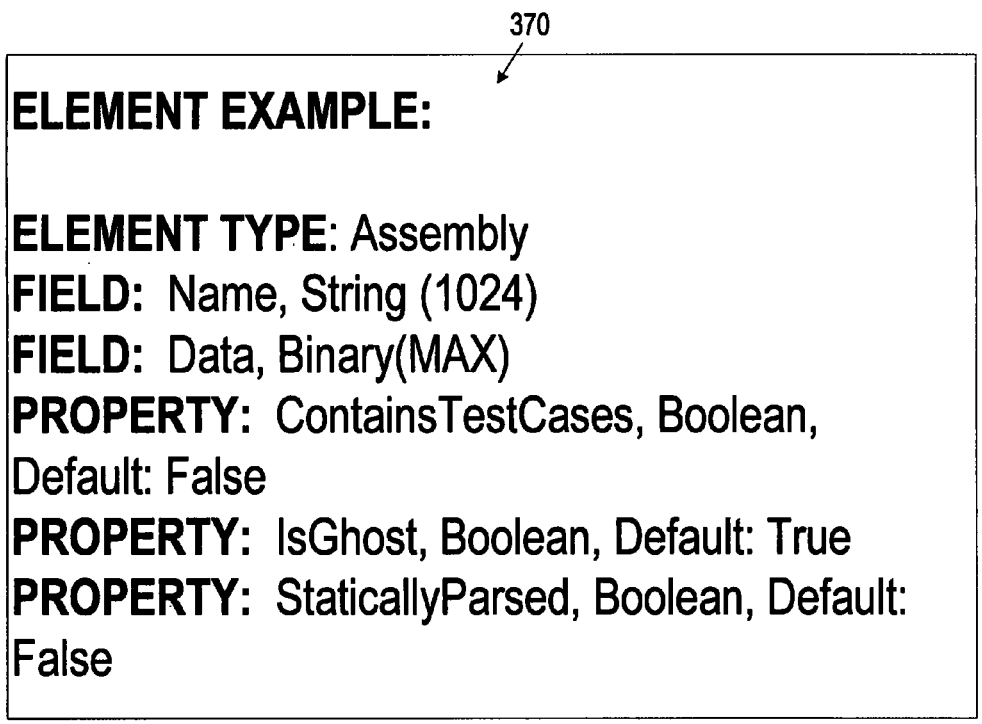
FIG. 7 is a diagram illustrating an exemplary element definition that has been defined using the element-specific fields shown in FIG. 6.

FIG. 7 is a diagram 370 that illustrates an example of an element that is being used to define an assembly in one implementation. The program structure is part of the general system provided information. The assembly is not referenced by the data store as an element, but tools from vendors and/or systems can annotate these assembly elements as needed. This in turn enables developers that work on lower level parts of this particular assembly to get the associated information. Without the shared element in the system, the association between tools working from the assembly on local desktops would be difficult to correlate to the smaller artifacts and/or work happening to the assembly. Suppose for example that developer X works on a test case for method 1 that is part of a class that is part of a namespace that is part of assembly Z which is marked as not needing test coverage at all. The system is now able to notify developer X that the test case being written is non-essential, though the user defining the requirement on assembly Z had no specific knowledge of what was happening on developer X's desktop.

Figure 8:
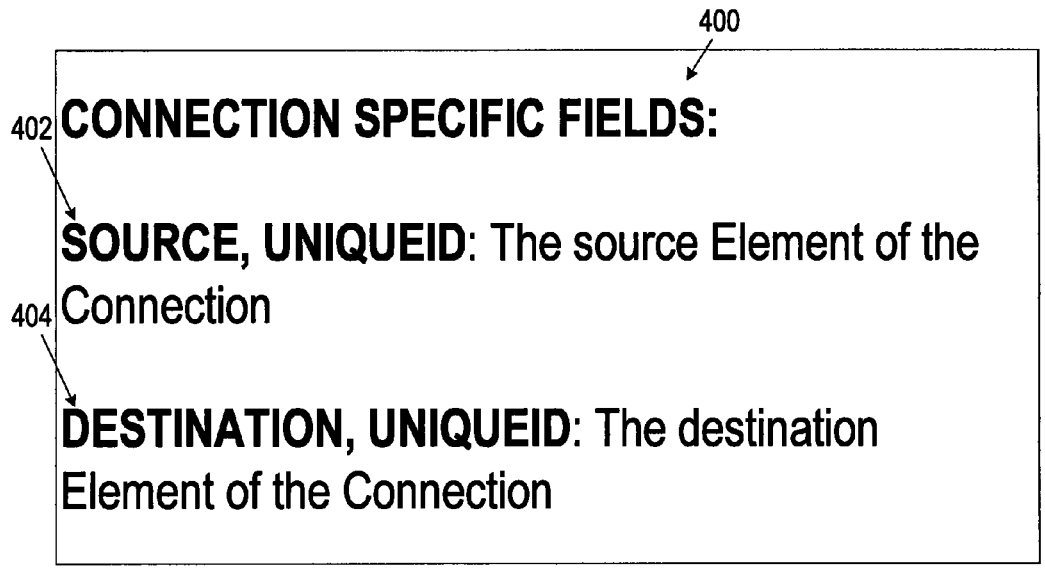
FIG. 8 is a diagram illustrating connection-specific fields contained in the central information store in one implementation of the system of FIG. 1.
Figure 9:
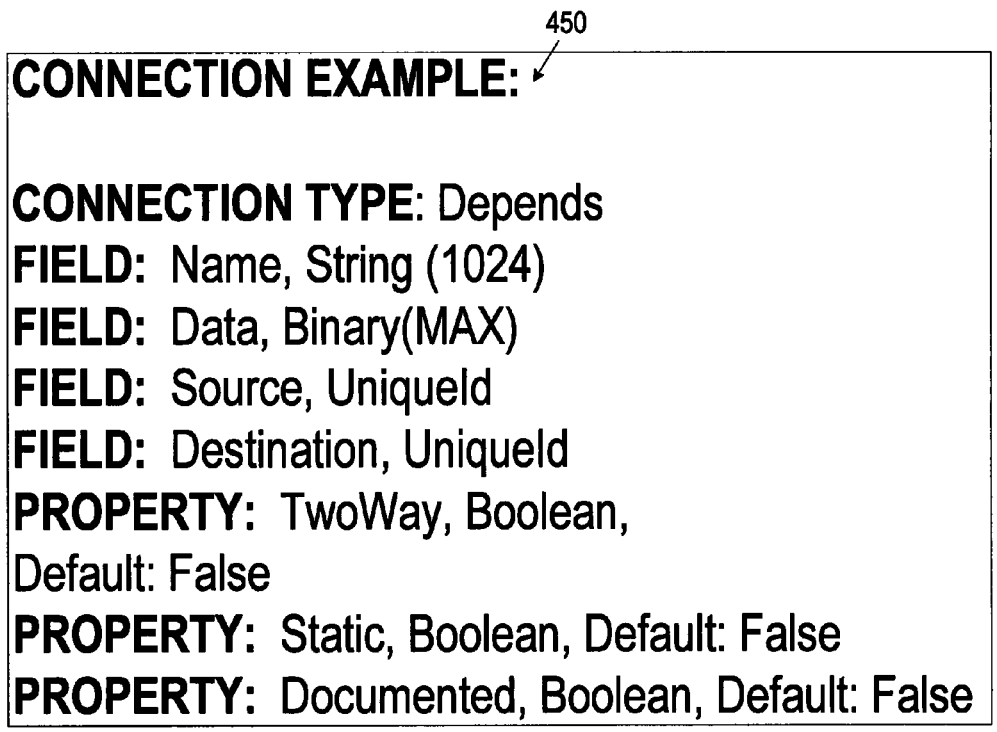
FIG. 9 is a diagram illustrating an exemplary connection definition that has been defined using the connection-specific fields shown in FIG. 8.

Turning now to FIG. 8, a diagram is shown that illustrates connection-specific fields 400 contained in the central information store in one implementation of the system of FIG. 1. In one implementation, connections are generic items which serve as verbs in the central information store. A few non-limiting examples of connections include depends, contains, authored, etc. Connections are used to relate two or more elements. Each connection contains a source field 402 and a destination field 404. FIG. 9 is a diagram 450 that illustrates an example of a connection that is being used to define a "depends" connection type. The central information store relies on the expression of relationships between defined types. These relationships serve as dynamic working links between nouns and provide an additional dimension of relation. For example, suppose you have an Assembly A as an element, and a Class Z as an element. Both can have annotations from tools associated with them once the system reflects these in the shared store. However, a Connection of type "contains" would further express that Assembly A contains Class Z and thus allows associative lookups to take place where without the connection, this association may not be possible. In one implementation, dynamic relationships are themselves dynamically defined.

Figure 10:
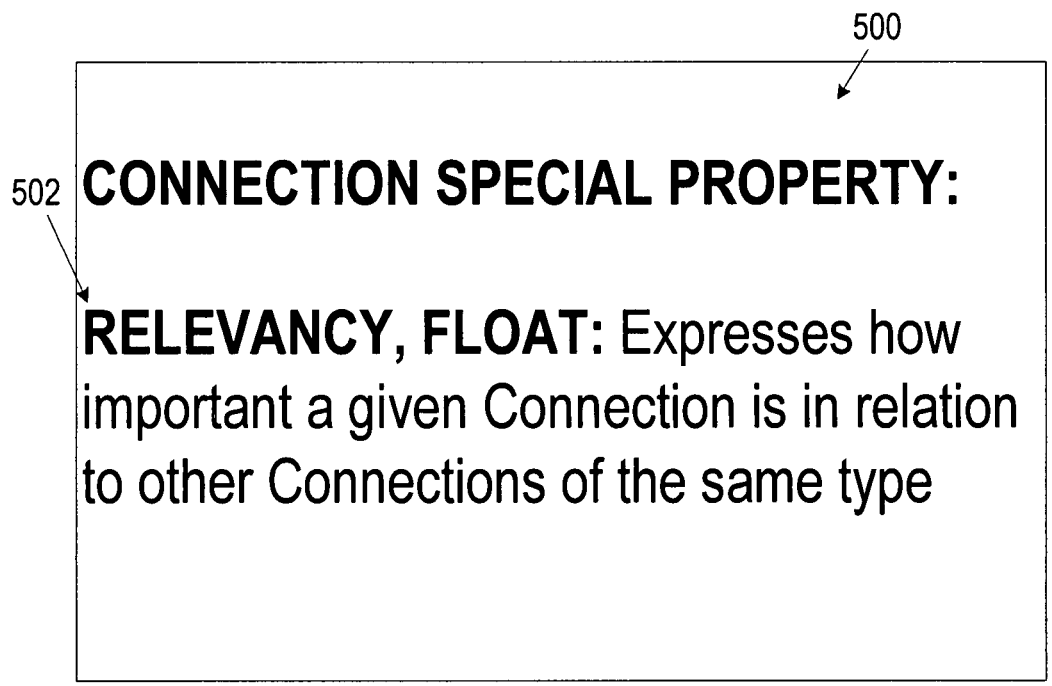
FIG. 10 is a diagram illustrating a special property that can be used with a connection definition in one implementation of the system of FIG. 1.

FIG. 10 is a diagram 500 illustrating a special relevancy property that can be used with a connection definition in one implementation of the system of FIG. 1. In one implementation, relevancy is a specialized property associated with every connection. In general terms, relevancy expresses how important a relationship between two elements is in relation to relationships between elements. A specific relevancy value for a relationship between two elements is assigned to the connection between the elements. Relevancy units can be defined by the individual vendor noting the connection and/or can be defined by the system. As the changes are made to the central information store, the overall use of the data and its effectiveness is reflected by the store. Relevancy provides a mechanism to enable weighting of verbs between artifacts. In this way, the system is able to use various forms of relationships differently. In one implementation, relevancy is an important part of the system as associations between items can number in the hundreds of thousands. In other implementations, relevancy is less important and/or is not even used.

In one implementation, trust is an additional specialized property given by the system to users, vendors and/or vendor-provided tools. As the system's data evolves, tool and user findings change over time. If tools are found to be inaccurate, the default trust weight associated with a specific vendor, tool or user can be changed. Doing so means the relevancy calculation is altered, weighting the calculation positively or negatively depending on the power of the trust factor. For example, static analysis of code can be used to find the links between test cases and code by examining the calling relationship of the test case to the development method. For this example, Tool X looks at these relationships and adds links between test code and development methods based on static relationships. By default, the system examines these relationships and notifies users of changes to modules connected by these links. If test A calls development method B, and method B changes, then the author of A should be notified. However, as the development cycle progresses, many times the users being notified of the changes may be notified when they do not care. This is because Tool X does not take into account additional factors (such as code complexity, number of calls, etc) that can mean a more or less important connection. Due to all of the negative feedback from users, the administrator or the system can lesson Tool X's Trust rating. As a direct result, when the calculation for which users are to be notified of a change takes place, a connection between two users from Tool X's links will be rated differently for Tool Y, in which case, Tool X's information will be trusted less.

Figure 11:
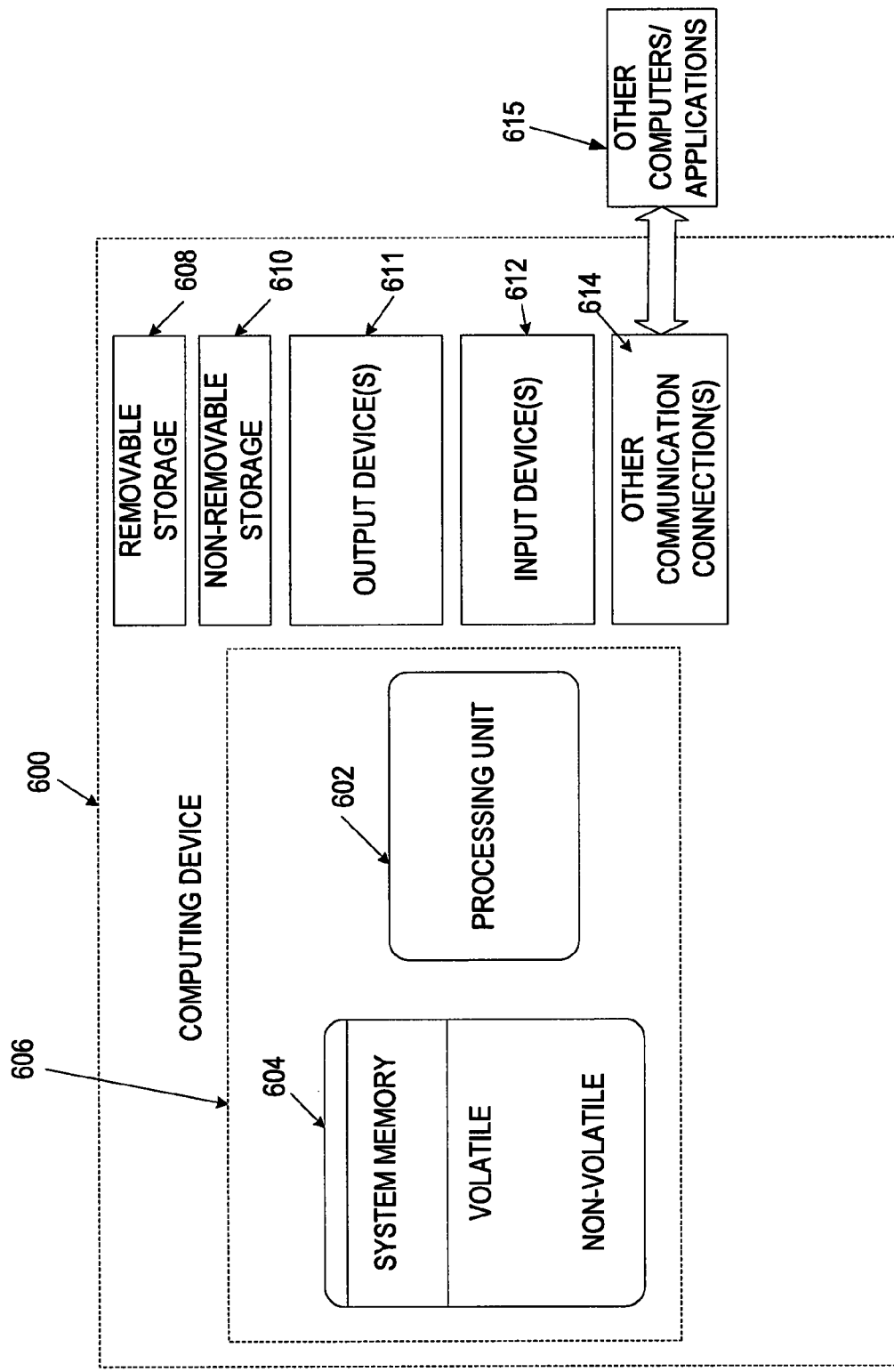
FIG. 11 is a diagrammatic view of a computer system of one implementation of the system of FIG. 1.

As shown in FIG. 11, an exemplary computer system to use for implementing one or more parts of the system includes a computing device, such as computing device 600. In its most basic configuration, computing device 600 typically includes at least one processing unit 602 and memory 604. Depending on the exact configuration and type of computing device, memory 604 may be volatile (such as RAM), non-volatile (such as ROM, flash memory, etc.) or some combination of the two. This most basic configuration is illustrated in FIG. I by dashed line 606.

Additionally, device 600 may also have additional features/ functionality. For example, device 600 may also include additional storage (removable and/or non-removable) including, but not limited to, magnetic or optical disks or tape. Such additional storage is illustrated in FIG. 11 by removable storage 608 and non-removable storage 610. Computer storage media includes volatile and nonvolatile, removable and non-removable media implemented in any method or technology for storage of information such as computer readable instructions, data structures, program modules or other data. Memory 604, removable storage 608 and non-removable storage 610 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 600. Any such computer storage media may be part of device 600.

Computing device 600 includes one or more communication connections 614 that allow computing device 600 to communicate with other computers/applications 615. Device 600 may also have input device(s) 612 such as keyboard, mouse, pen, voice input device, touch input device, etc. Output device(s) 611 such as a display, speakers, printer, etc. may also be included. These devices are well known in the art and need not be discussed at length here. In one implementation, computing device 600 includes submission and notification application 200 and/or meta-model storage application 240.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the client and/or server arrangements, user interface screen content, and/or data layouts as described in the examples discussed herein could be organized differently on one or more computers to include fewer or additional options or features than as portrayed in the examples.

What is claimed is:

1. A computer-readable storage medium having computer executable instructions for causing a computer to perform steps comprising:

provide a submission service that is operable to submit at least a portion of an active meta-model of an application to a central information store for use by a plurality of users, the application having source code, the active meta-model including artifacts associated with a structure of the application underlying the source code, the submitted portion comprising an element, a name identifying the element, and data describing the element, the element defined dynamically; and provide a notification service that is operable to receive a notification relating to a change in the active meta-model wherein the notification is configured to be sent to a user or set of users according to a policy.

2. The computer-readable storage medium of claim 1, wherein the notification service is operable to receive changes that are made by a process.

3. The computer-readable storage medium of claim 1, wherein the notification service is operable to receive changes that are made by a user operation.

4. The computer-readable storage medium of claim 1, wherein the active meta-model contains intermediate code.

5. The computer-readable storage medium of claim 1, wherein the active meta-model contains annotations.

6. The computer-readable storage medium of claim 1, wherein the active meta-model contains user-generated artifacts.

7. The computer-readable storage medium of claim 1, wherein the notification service is further operable to display meta-model information to a particular one of the plurality of users.

8. The computer-readable storage medium of claim 1, wherein the notification service is operable to be integrated into a development environment such that meta-model information is displayed in the development environment.

9. A computer-readable storage medium having computer-executable instructions for causing a computer to perform the steps comprising:

provide a reception service that is operable to receive active meta-model information of an application being developed by a plurality of users, the application having source code, the active meta-model including artifacts associated with a structure of the application underlying the source code;

provide a storage service that is operable to store the received active meta-model information in a specific relational database structure that is operable to allow artifacts to be added without alteration to the specific relational database structure, the specific relational database structure operable to store a name identifying a specific element and data describing the specific element, the specific element defined dynamically; and receive a request to retrieve active meta-model information from a notification service, the notification service being operable to configure a notification to send to a client device or a set of client devices according to a policy, and to notify the client device or set of client devices of changes to the active meta-model with the notification.

10. The computer-readable storage medium of claim 9, wherein the specific relational database structure is operable to store a name identifying a specific connection, data describing the specific connection, a source of the specific connection, and a destination of the specific connection.

11. The computer-readable storage medium of claim 10, wherein the specific relational database structure is operable to store relevancy information for a specific connection.

12. A method for providing a software development application comprising the steps of:

communicating with a submission service to update an active meta-model of an application in a central information store used by a plurality of users, the application having source code, the active meta-model including artifacts associated with a structure of the application underlying the source code, the update comprising an element, a name identifying the element, and data describing the element, the element defined dynamically;

receiving a notification from a notification service of changes to the active meta-model, wherein the notification is configured to be sent to a user or set of users according to a policy; and using the notification service to update a display in a software development application.

13. The method of claim 12, wherein the submission service is a component of the software development application.

14. The method of claim 12, wherein the notification service provides policy violation alerts.

15. The method of claim 12, wherein the notification service provides dependency alerts.

16. The method of claim 12, wherein the notification service provides performance alerts.

17. The method of claim 12, wherein the notification service provides alerts to indicate application code currently being modified by another user.

18. A computer-readable storage medium having computer-executable instructions for causing a computer to perform the steps recited in claim 12.

* * * * *